United States Patent
Birns et al.

[11] Patent Number: 6,012,128
[45] Date of Patent: *Jan. 4, 2000

[54] MICROCONTROLLER HAVING A PAGE ADDRESS MODE

[75] Inventors: Neil E. Birns, Milpitas; Ori K. Mizrahi-Shalom, San Jose, both of Calif.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/999,667

[22] Filed: Oct. 14, 1997

Related U.S. Application Data

[63] Continuation of application No. 08/308,052, Sep. 16, 1994, abandoned.

[51] Int. Cl.[7] .................................................. G06F 12/02
[52] U.S. Cl. .................................. 711/163; 711/2; 711/5; 711/152; 711/154
[58] Field of Search ............................... 711/5, 100, 154, 711/152, 145, 163, 2, 157; 713/1

[56] References Cited

U.S. PATENT DOCUMENTS

| | | | |
|---|---|---|---|
| 4,937,820 | 6/1990 | Kawula | 370/111 |
| 5,274,786 | 12/1993 | Diehl | 395/421.08 |
| 5,392,406 | 2/1995 | Petersen et al. | 395/325 |
| 5,446,898 | 8/1995 | Bealkowski et al. | 395/427 |
| 5,479,641 | 12/1995 | Nadir et al. | 395/455 |
| 5,483,646 | 1/1996 | Uchikoga | 395/427 |
| 5,642,491 | 6/1997 | Rose et al. | 711/2 |
| 5,659,713 | 8/1997 | Goodwin et al. | 711/157 |
| 5,737,604 | 4/1998 | Miller et al. | 713/1 |
| 5,758,124 | 5/1998 | Ogata et al. | 395/500.48 |

OTHER PUBLICATIONS

Philips. "8051–based 8–bit Microcontrollers" Data Handbook, 1991.

*Primary Examiner*—Eddie P. Chan
*Assistant Examiner*—Than V. Nguyen
*Attorney, Agent, or Firm*—Anne E. Barschall

[57] ABSTRACT

A microcontroller with a page zero mode where a memory address space is restricted to one page of a multiple page address space to produce improved performance. Address mapping logic and memory segment selection logic limits addresses to the least significant 16 bits of a possible 24 bit address. Different or alternate microcode program controlled instruction sequences with eliminated high order address clock cycles are used in the page zero mode.

12 Claims, 5 Drawing Sheets

MICROCONTROLLER HAVING A PAGE ADDRESS MODE

This is a continuation of application Ser. No. 08/308,052, filed Sep. 16, 1994, now abandoned.

BACKGROUND OF THE INVENTION

1. Field of the Invention

The present invention is directed to a microcontroller that has an address range for data and instruction memories that includes sixteen megabytes divided into two hundred and fifty six pages of sixty four kilobytes each, and that has a page zero mode which limits program code and data addresses to a first page of instruction and data memory and, more particularly, to a system where all instruction and data addresses are limited to the least sixteen significant bits of a possible twenty four bit address allowing improved performance and reduction in the use of stack space.

2. Description of the Related Art

In microcode program controlled microcontrollers that allow large amounts of instruction and data memory, such as sixteen megabytes, and use a large address, such as twenty-four bits, when a program is limited to a smaller segment of the memory, for example 64 kilobytes (kb), instruction and data address bits 15–23 do not change and instruction clock cycles updating these bits during a fetch (read) or place (write) operation are wasted, resulting in less efficient execution in such situations. When the microcontroller is configured with only a limited amount of instruction and data memory, such as 64 Kb, the same waste of clock cycles can occur. This waste of instruction clock cycles is particularly apparent when jump, call and return and other program flow change type instructions are executed. The waste is even more apparent when interrupts and exceptions and the returns from these operations are performed since the operations move the program counter contents to and from a stack.

What is needed is a system that does not update and ignores the most significant bits of an address during fetch and place or write operations.

SUMMARY OF THE INVENTION

It is an object of the present invention to provide a microcontroller with a page mode where computer memory access operations are limited to a page of memory.

It is another object of the present invention to provide a mode where instruction clock cycles that update upper order address bits are not performed.

It is also an object of the present invention to provide a mode where addresses are limited in bit size.

It is an additional object of the present invention to reduce stack usage.

The above objects can be attained by a microcontroller that has a page zero mode in which a memory address space can be restricted to less than the entire address space to produce improved memory access performance. The address of each data or instruction memory access is restricted to the least significant bits of the possible address constraining the microcontroller to addressing only a first or zero page of 64 kilobytes of a possible 256 pages or a total of 16 megabytes. Address mapping and limit logic limits addresses to the least significant 16 bits of a possible 24 bit address. Different or alternate microcode program controlled instruction sequences for the page zero mode reduce the number of instruction clock cycles for instructions which ordinarily address the entire address space.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed to a 16-bit microcontroller system that includes an address space of preferably 16 megabytes (Mb) and includes a page zero mode where only a first or zeroth page of 64 kilobytes (Kb) is addressed. When the microcontroller is configured with 64 Kb or less of separate instruction and data memory, some or all of which can be on-chip, or the program being executed is 64 Kb or less each of instructions and data, the operations of producing the upper 8 bits of a 24 bit address can be eliminated by putting the microcontroller in the page zero mode, thereby improving performance and interrupt latency which is the time required to get to an interrupt service routine.

Figure 1:
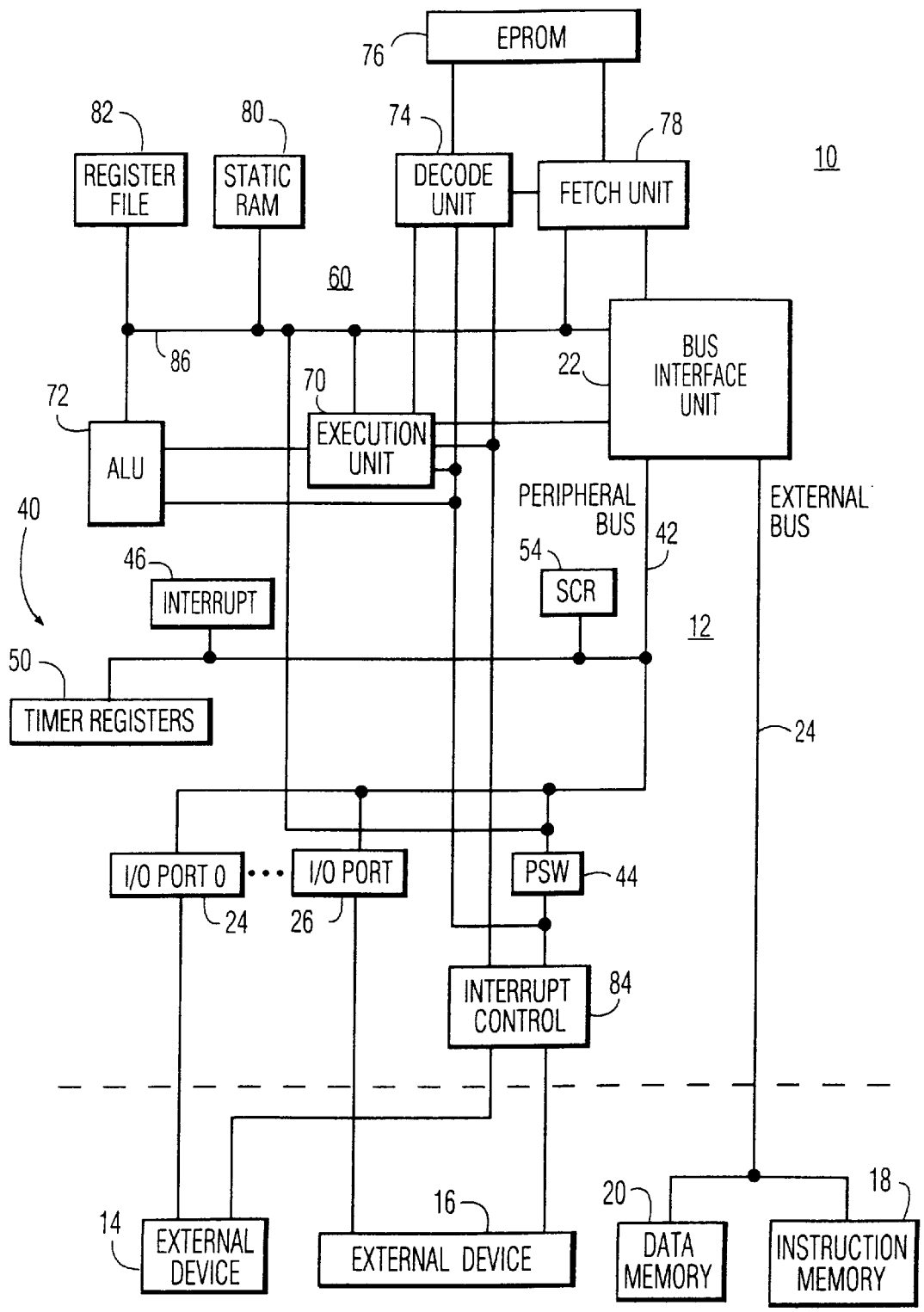
FIG. 1 illustrates a microcontroller according to the present invention.

The architecture of the microcontroller system 10 of the present invention is illustrated in FIG. 1. This system 10 includes a single chip microcontroller 12 that performs 16-bit arithmetic operations and includes internal instruction and data storage preferably configured with from 8 Kb to 64 Kb. The microcontroller 12 supports external devices 14 and 16 and, through 24 bit external address capability, supports sixteen megabytes of external instruction storage 18 and sixteen megabytes of external data storage 20. The microcontroller 12 includes a bus interface unit 22 which communicates with the external memories 18 and 20 over an external bi-directional address and data bus 24 and handles all external communications responsive to requests from an execution unit and a fetch unit. The microcontroller 12 communicates with the external devices 14 and 16 through I/O ports 26–28 which are addressable as special function registers (SFR) 40. The ports 26–28 as well as other special function registers are addressable over an internal peripheral bus 42 through the bus interface unit 22.

The data memory 20 can also be accessed as off-chip memory mapped I/O through the I/O ports 26–28. The on-chip special function registers 40, some of which are bit addressable, also include a program status word (PSW) register 44 coupled to an interruption control unit 84 communicating with the external devices as well as an ALU 72, the execution unit 70 and the decode unit 74 for flag and general control. Also included are an interrupt register 46, timer registers 50 and a system configuration register (SCR) 54 containing system configuration bits including a bit that indicates the page zero mode. The program status word register 84 is addressable over the peripheral bus 42 for general register operations and is also addressable over a connection to an internal bus 86 for other execution related operations. The bus interface unit 22 isolates the peripheral special function registers 40 from the microcontroller core 60. The core 60 includes the microcode programmable execution unit 70 which controls execution of instructions by an ALU 72 and the other units. The instructions decoded by the decode unit 74 are fetched from an internal EPROM 76, which is part of the instruction memory space, or from the external instruction memory 18 by a fetch unit 78. Static RAM 80, which is part of the data memory space, as well as general purpose registers of a register file 82 are also available for instruction and data storage. The program status word register 44 includes a 16-bit program status word which is pushed onto and popped from a stack during procedure calls (including exceptions and interrupts) and returns. The PSW register 44 is a word register in the bit-addressable SFR space 40. A high byte is a protected half containing the system/supervisor level flags. A second byte contains all user level flags and functions as described below. The system configuration register (SCR) 54 is a byte register that contains system configuration flags. This register 54 includes flags that are intended to be programmed once after reset and left alone thereafter. These flags therefore do not need to be saved during interrupts or other procedures. One of these flags the PZ or page zero flag is important to the preferred embodiment. When set, the PZ flag, through the selection of microcode control and target address detection logic, to be discussed in more detail later, forces generation of only 16-bit data and program memory addresses for small memory configuration applications, allowing other uses for the port that would otherwise output the high address byte. When this mode is active, interrupts will save only a 16-bit return address on the stack.

Figure 2:
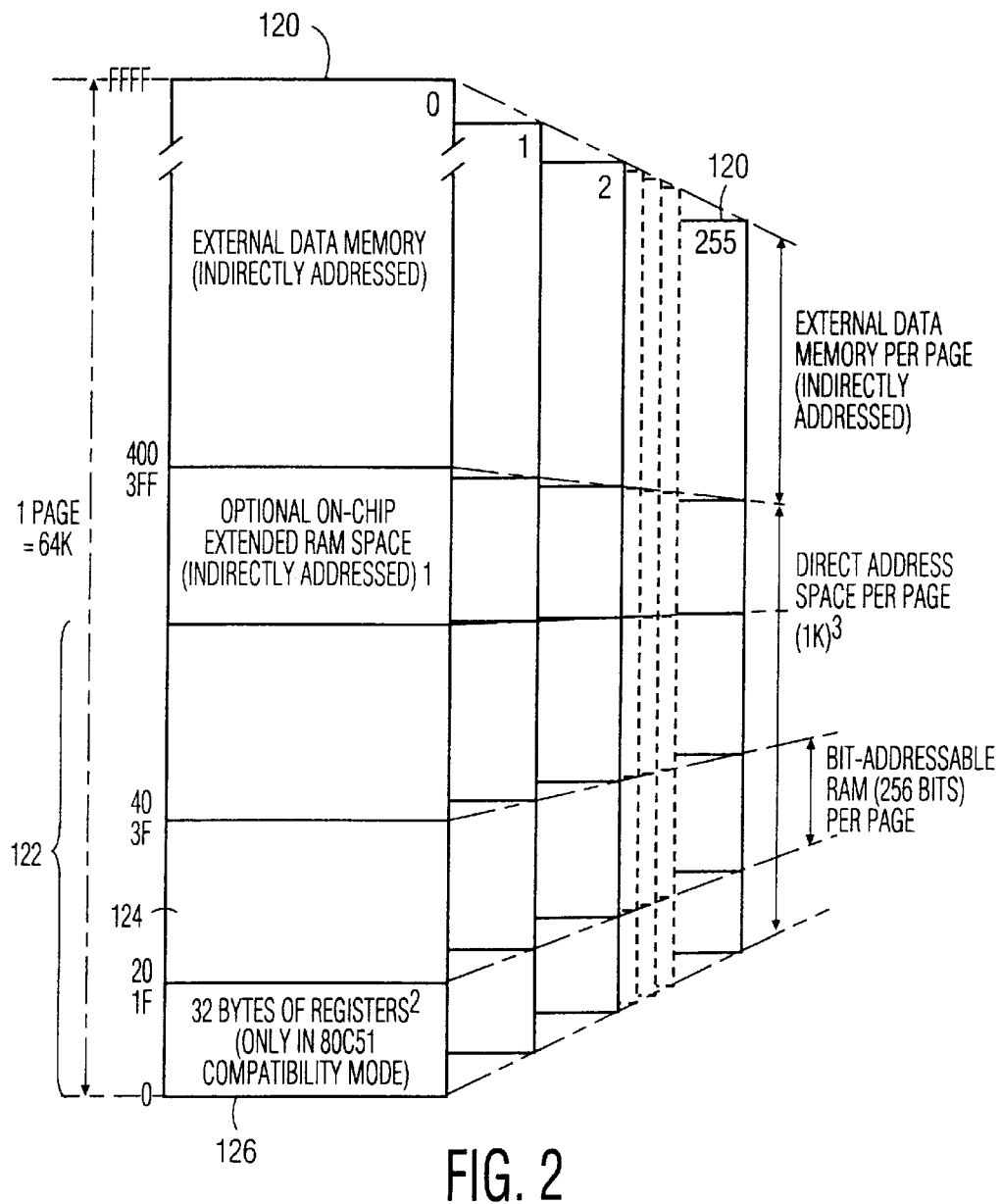
FIGS. 2 and 3 depict memory organization.
Figure 3:
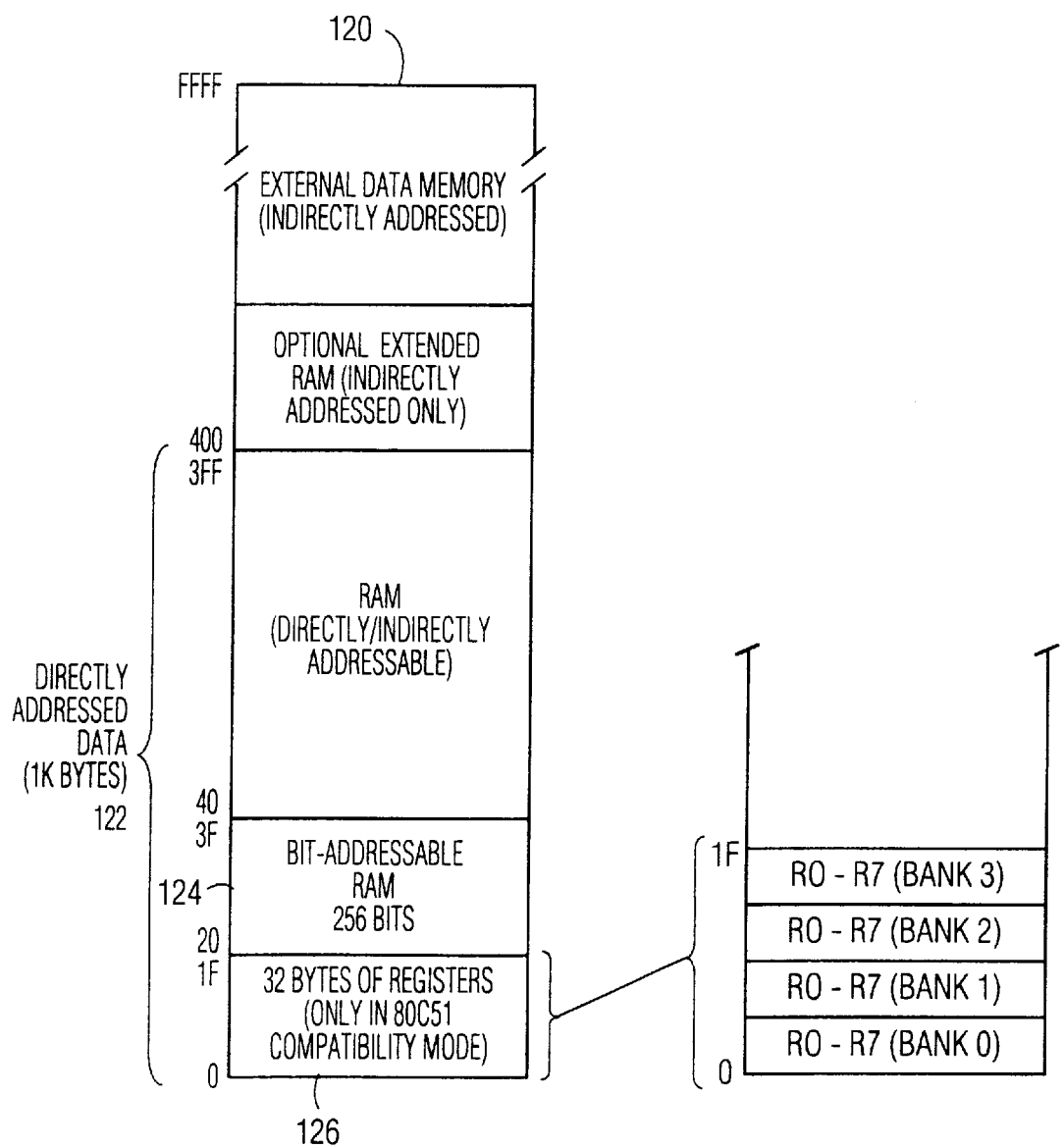

The microcontroller 12 preferably includes a memory organization as illustrated in FIGS. 2 and 3 where FIG. 2 illustrates the organization into pages and FIG. 3 depicts the organization of a page in more detail. As previously discussed, the microcontroller 12 has separate address spaces for instruction memory and data memory. The logical separation of program and data memory allows faster access of data memory. The term "data memory" refers to on-chip RAM 80, off-chip RAM 18 or off-chip memory mapped I/O. The data memory space 118 is segmented into 64 Kb pages 120, accessed via indirect addressing modes (the first 1 K block of each page is also directly addressable). Preferably, 512 bytes of data memory are implemented as on-chip RAM 80, but there is no architectural limitation on the minimum or maximum data memory that may be on-chip. The microcontroller 12 architecture allows up to 1 K of direct addressing space 122 for data memory per page. The SFR space 40 uses the upper 1 K of addresses in the direct address field but is not part of the data memory map. There are four banks of registers R0 through R7 (see FIG. 3) starting at address 0 in the on-chip RAM (in the register file 82) and going up to address 1 F hexadecimal. One of the four banks is selected as the active bank by two bits in the PSW. The selected bank appears as the general purpose registers. When off-chip RAM 20 is mapped outside on-chip RAM 80 range, under microcode program and address logic control, any access to this address space will automatically fetch off-chip data, giving the microcontroller 12 a linear address space from 0 to 16 megabytes. Off-chip data memory on page 0 that overlaps the on-chip memory, in the same addressable space, under microcode program code and address logic control, may only be accessed by indirect addressing. The bottom 1 K bytes 122 of every data memory segment 120, under microcode and address logic control, is directly addressable data space. This addressing mode contains the low 16-bits of the data address within the instruction. A segment register (SR) associated with the direct address space which forms the upper byte of the 24-bit address is the data segment (DS) register. The special function registers 110, including the SCR 54, are in the 1 K direct address block 139 from address 400 to 7 FF hex. The first half 140 of this block is the on-chip SFR space. This area of SFRs is used to access SFR mapped registers, such as the SCR 54, and control and data registers for on-chip peripherals and I/Os.

As previously mentioned, the architecture supports RAM space segmentation into 256 pages each 64 K size. Direct addresses are limited to 1 K of each page of the segmented memory. A 24-bit direct address is formed by DS (upper 8-bits) and an address of this 1 K direct space formed in an instruction. Depending on the instruction, the value may be 4-bits, 8-bits, or 16-bits in size. Indirect addresses are formed by the use of a 16-bit pointer register (from the register file 82) appended to the 8-bit data segment register (DS) or the extra segment register (ES). This segmentation allows for streamlining the encoding and execution of memory access instructions as well as providing simple segregation of processes running under a multi-tasking system. This mode can address an entire 64 k data segment, which may be anywhere in the 16 MB address space, depending on the segment register contents. Word registers R0–R7 are also used as address pointers during indirect and indirect-offset addressing modes. Word register R7 is the stack pointer, either the system stack pointer or the user stack pointer depending on the whether the microcontroller 12 is in the system or user mode. A SFR addressing mode addresses the 1 K SFR space. Although encoded into the same instruction field as the direct addressing described above, this is actually a separate space. An indirect-offset addressing mode is provided and uses the sum of an address register and an immediate offset value as the effective address of the operand. The offset can be either an 8-bit signed value or with a 16-bit signed value. This potentially provides access to an entire data segment with this mode.

Memory in the system 10 is addressed in units of bytes, each byte consisting of 8-bits. A word is a 16-bit value, consisting of two contiguous bytes. The storage order for data in the microcontroller 12 is "Little Endian" such that the lower byte of a word is stored at the lower address and the higher byte is stored at the next higher address.

The external bus 24 can be configured in 8 or 16-bit mode, selected during chip reset. Depending on the mode of operation selected, all 16-bit external data accesses could be strictly words (16-bit mode) or bytes from consecutive memory locations (8-bit mode). An external word fetch in 8-bit mode results in 2 separate byte accesses (the result is the same in a single word access if the data is on-chip).

In the microcontroller 12 the stack which is used during call and return operations grows downward from high to low addresses. The microcontroller 12 architecture supports a LIFO (last-in first-out) stack. At any given time, the stack pointer (SP) found in register R7 points to the last word pushed onto the stack. When new data is pushed, the stack pointer is decremented prior to writing to memory. When data is popped from the stack, the stack pointer is incremented after the data is read from memory. Stack operations are facilitated by the two stack pointers: a user stack pointer (USP) and a system stack pointer (SSP) located in the registers of register file 82. The 16-bit stack pointers are customary top-of-stack pointers, addressing the uppermost datum on the push-down stack. It is referenced implicitly by PUSH and POP operations, subroutine calls, and interrupt operations. If the user stack for a particular application would exceed the space available in the on-chip RAM 80, or on-chip RAM 80 is needed for other time critical purposes (since on-chip RAM 80 is accessed more quickly than off-chip memory 20), the user stack can be put off-chip and the interrupt stack (using the system SP) may be put in on-chip RAM 80. The system stack is always forced to data memory segment 0 (the first 64 K bytes or page of data memory), while the user stack is located on the segment chosen by the DS (Data Segment) register.

Complete programs generally consist of many different modules or segments. However, at any given time during program execution, only a small subset of a program's segments are actually in use. A working data segment address includes a 16-bit address (pointer) and an 8-bit segment. The SFR 8-bit segment registers particularly the data segment (DS) or extra segment (ES) registers hold the offset which is used to identify this current segment. These segment registers are used as extension to 16-bit pointer registers and stack pointers to allow data to be accessed through the entire 16 megabyte address range. The SFR space 46 includes a byte register that contain bits that are associated with each of the seven general purpose pointer registers (i.e not the SP) and that selects either DS or ES as the source for the most significant 8-bit for the 24-bit address. This register is called the segment select register or SSEL. Segment registers are not automatically incremented or decremented along with their associated pointer registers, but must be altered explicitly by instructions.

Exceptions and interrupts are events that pre-empt normal instruction processing. Exception and interrupt processing makes the transition from normal instruction execution to execution of a routine that deals with an exception or interrupt. Each exception and interrupt has an assigned vector that points to an associated handler routine. Exception and interrupt processing includes all operations required to transfer control to a handler routine, but does not include execution of the handler routine itself. Exception/interrupt vectors are contained in a data structure called the vector table, which is located in the first 256 bytes of code memory, page 0. All vectors consist of 2 words which are (i) the address of the exception handler and (ii) the initial PSW contents for the handler. All exceptions and interrupts other than RESET cause the current program counter (PC) and PSW values to be stored on the stack and are serviced after the completion of the current instruction. During an exception or an interrupt, the 24-bit return address, or the 16-bit address when in page zero mode, and the current PSW word are pushed onto the stack. The stacked (hi-byte) and (lo-word) value is the 24-bit address or the stacked low word value is the 16-bit address of the next instruction in the current instruction stream. After the stack push, the program counter (PC) is loaded with the address of the corresponding handler routine from the vector table and the PSW register 44 is then loaded with a new value stored in the upper word of the corresponding vector.

There are several ways in which code or instruction addresses may be formed to execute instructions on the microcontroller 12. Changing the program flow is done with simple relative branches, long relative branches, 24-bit jumps and calls, 16-bit jumps and calls, and returns. Simple relative branches use an 8-bit signed displacement added to the program counter (PC) to generate the new code address. The calculation is accomplished by shifting the 8-bit relative displacement left by one bit (since it is a displacement to a word address), sign extending the result to 24-bits, adding it to the program counter contents, and forcing the least significant bit of the result to zero. The long relative unconditional branch (JMP) and call with 16-bit relative displacements use the same sequence. Far jumps and calls include a 24-bit absolute address in the instruction and simply replace the entire program counter contents with the new value. The address range is anywhere in the 16 Mb address space for the microcontroller 12. Return instructions obtain an address from the stack, which may be either 16 or 24-bits in length, depending on the type of return and the setting of the page zero mode bit in the SCR register. A 24-bit address will simply replace the entire program counter value. A 16-bit return address replaces only the bottom 16-bits of the PC.

Figure 4:
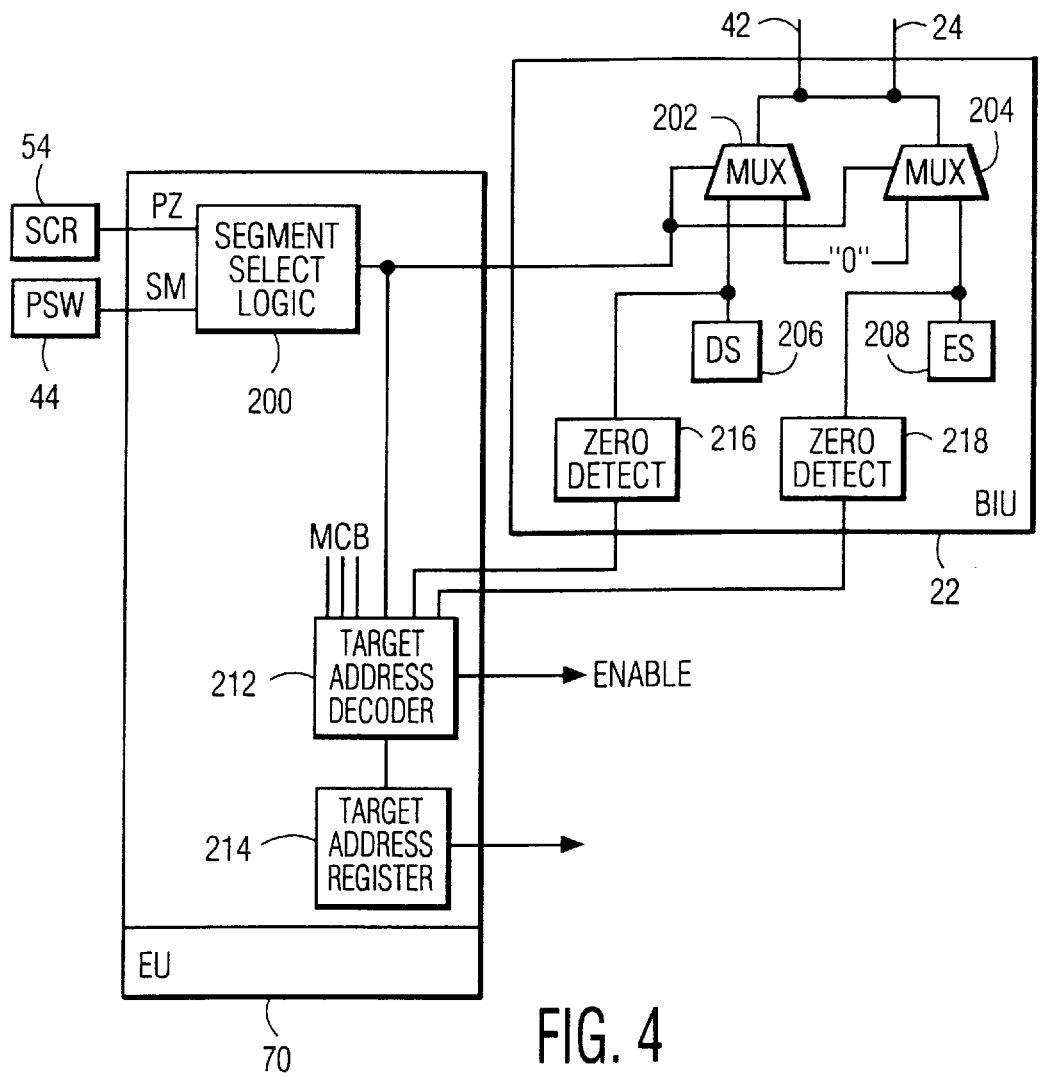
FIG. 4 depicts page zero address circuitry.

During an addressing operation in the full and page zero modes of operation several different units within the core 60 (see FIG. 1) are involved. The execution unit 70, as illustrated in FIG. 4, includes segment select logic 200 that receives the system (SM) mode bit from the program status register (PSW) 44 indicating either the user or system modes and receives the page zero (PZ) mode bit from the system configuration register (SCR) 54. From the PZ bit the segment select logic 200 determines whether the microcontroller 12 is in the page zero mode or the full address space mode. The segment select logic 200 provides a two bit segment select signal to 8 bit multiplexers 202 and 204 of the bus interface unit (BIU) 22. When in the full address mode the multiplexers 202 and 204 select an address value from the data (DS) 206 or extra (ES) 208 segment registers and provide the address to the external address bus 24, as appropriate. During the page zero mode the multiplexers 204 and 204 select and provide a "0" value address to the bus 24.

As previously discussed, the microcontroller 12 can be configured with different amounts of on-chip data and instruction memory. The particular on-chip instruction and data memory configuration is indicated by hardwired memory configuration bits (MCB) which indicate configurations of allowed sizes of on-chip instruction memory: 4 Kb, 8 Kb, 16 Kb, 32 Kb and 64 Kb; and data memory 256 bytes, 512 bytes, 1 Kb and 2 Kb, respectively. These bits are provided to memory mapping logic or a target address decoder 212 which determines what physical memory device (register file 82, static RAM 80 and BIU 22 for external memory 18 or 20 and SFR space 40) is being addressed from the target address stored in a target address register 214 and in the segment registers 206 and 208. The content of the target address register 214 is also provided to the BIU 22 and the memory address registers of all the on-chip memory devices through the internal bus 86. The particular memory device being addressed also depends on whether the microcontroller is in the page zero mode which is indicated to the decoder 212 by the segment select logic 200. The decoder 212 also receives zero detect signals from zero detect circuits (multiple bit AND gates) 216 and 218 of the BIU 22 which indicate whether all the bits of the DS and/or ES registers are zero. When any of the bits of the DS or ES registers are non zero the target DS or ES address must be greater than 64 Kb. From this information the target address decoder 212 provides an enable signal to the appropriate on-chip device or the BIU 22. If the BIU 22 is enabled, the decoder 212 also indicates whether SFR space 40 or external memory is being addressed. The particular device or the BIU 22 performs the particular type of memory access (read or write) that is being requested. By using the segment select logic 200 in combination with the address decoder 212 the upper or most significant bits of memory accesses are ignored during page zero mot operation and accesses are limited to a single 64 Kb page (the first page or page 0) resulting in faster accesses.

Figure 5:
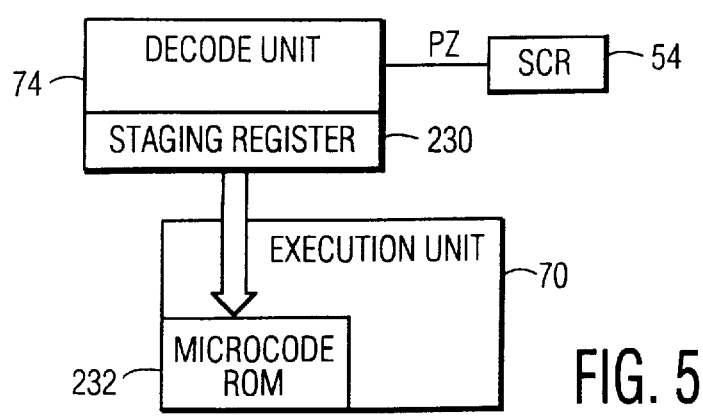
FIG. 5 illustrates microcode program addressing.

As previously discussed, the microcontroller 12, when executing call and return instructions and other branch type instructions in the mode where the full address space is accessible operates with a 24 bit instruction or program counter address. In the page zero mode only 16 bits are used and this allows clock cycles of the these type of instructions to be eliminated. To accomplish this the decode unit 74 receives the page zero (PZ) bit from the SCR 54, as illustrated in FIG. 5. When the bit indicates the normal or full address mode the decode unit 74, through a conventional staging register 230, provides a microcode program start address of a microcode program to the microcode ROM 232 of the execution unit 70 for an instruction that performs 24 bit address operations. When the page zero mode is indicated the decode unit 74 provides a start address of a different microcode program that performs the operations of the same instruction but using only a 16 bit address and in which one or more clock cycles are eliminated.

Figure 6:
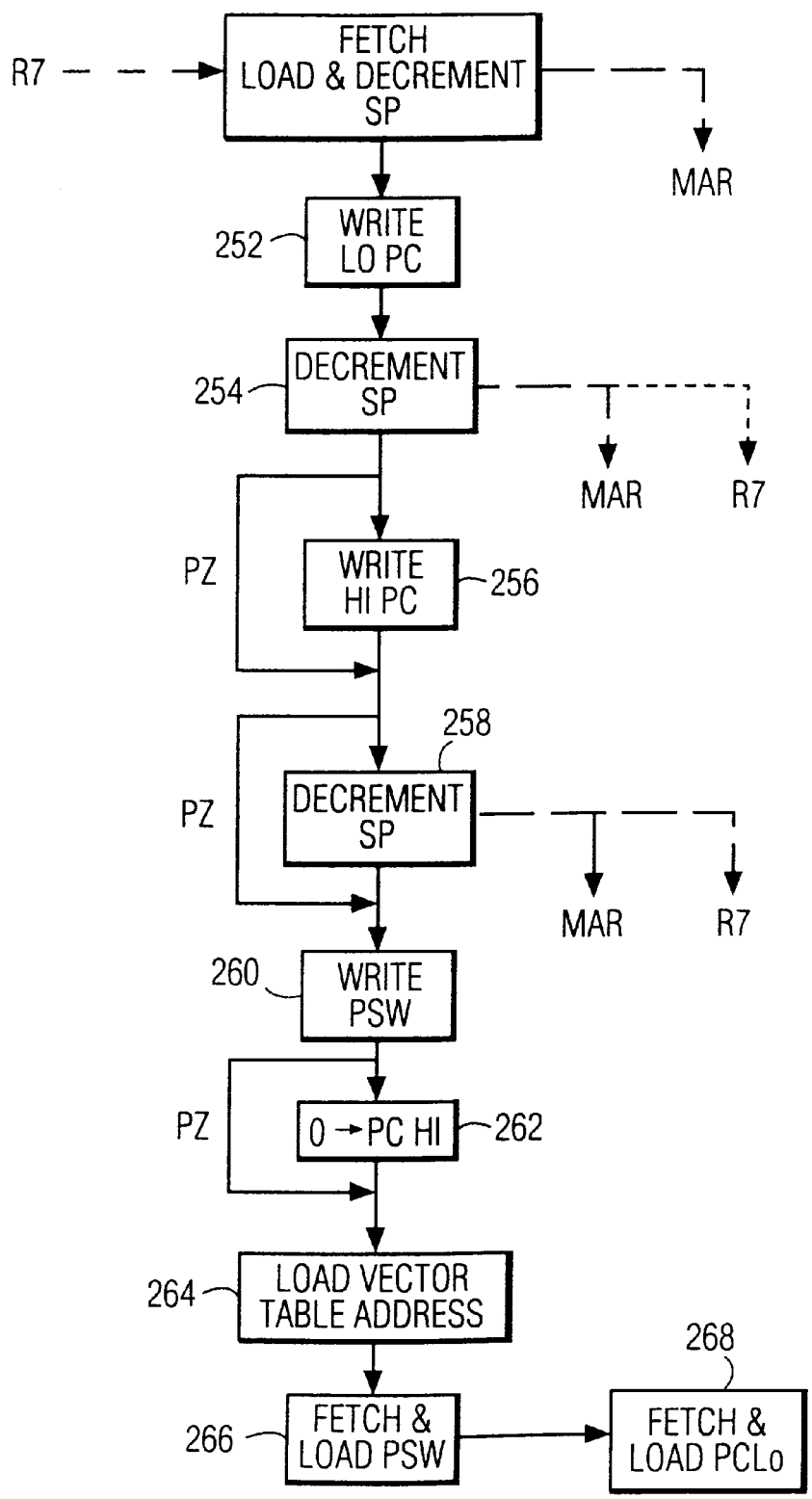
FIG. 6 depicts steps of a call interrupt (CALLI) instruction.

As an example of a microcode program where steps are eliminated, in particular a call interrupt (CALLI) instruction, will be discussed with respect to FIG. 6. Of course the same principles apply to the return and other branch of program flow type instructions. During a normal call interrupt instruction execution the first step is to fetch and load the contents of the stack pointer register (R7) into the ALU 72 where the stack pointer (SP) is then decremented, provided to the memory address register (MAR) and loaded back into the ALU 72. The low order or least significant bits (LSB) of the program counter (PC) is then written 252 to the memory at the address in the MAR. The ALU 72 is again decremented 254, stored in the MAR and loaded back in the ALU 72. The high order or most significant (MSB) bits of the PC are then stored 256 in memory. This step of storing the MSB of the PC is not performed in the page zero (PZ) microcode program for a CALLI instruction as illustrated by the PZ branch around step 256. The ALU 72 is again decremented 258, provided to the MAR and also stored in the stack pointer register (R7). In the page zero version of the program step 258 does not occur as shown by the PZ bypass path and step 254, in addition to providing the address to the MAR, stores the pointer SP in the register R7 as indicated by the dashed line to R7. The PSW is then stored 260 in the location of the MAR contents. A zero value is then stored 262 in the upper or MSB of the program counter since all interrupt routines start in the first page of memory. This zero forcing operation is not performed in the page zero mode. The vector table address designated in the interrupt is loaded 264 into the ALU 72 and into the MAR and used to fetch 266 the PSW which is then loaded into the PSW register 44. The ALU 72 is incremented, the value loaded into the MAR and the low order or LSB of the PC is fetched 268 and loaded. This ends this instruction. As can be seen several steps of the normal microcode instruction sequence are skipped when the instruction is executed in the page zero mode. In addition, address operations during the microcode program of the zero page mode are limited to the restricted or limited address space of page zero (the first 64 Kb). That is, the microcode steps are limited to using low order addresses.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A microcontroller, comprising:
   a memory having a first address space with address words having a first number of bits; and
   a computer coupled to said memory and comprising:
      mode means for setting a mode of access of the first address space;
      address means for restricting access of bits of the address words to a second number of bits less than the first number of bits of said address word in response to the mode set;
      the second number of bits are lower order address bits of the address word;
      said address means sets the upper order address bits of the address word to zero in a page zero mode; and
      execution means for performing address operation using the second number of bits.

2. A microcontroller as recited in claim 1, wherein said execution means executes a program flow change instruction microcode program with a predetermined number of clock cycles in a normal mode and with a number of clock cycles less than the predetermined number in the page zero mode.

3. A microcontroller as recited in claim 1, wherein said execution means includes first and second sets of microcode programs, the second set being limited to low order address operations in the page zero mode.

4. A microcontroller, comprising:
   a memory having a first address space; and
   a computer coupled to said memory and comprising:
      address means for restricting addresses to a second address space less than the first address space of said memory by holding and restricting stack location to the second address space upper order address bits at a zero value in a page zero mode; and
      execution means for performing address operations limited to the second address space, executing a program flow change instruction microcode program with a predetermined number of clock cycles in a normal mode and with a number of clock cycles less than the predetermined number in the page zero mode and including first and second sets of microcode programs, the second set being limited to low order address operations in the page zero mode.

5. A method of performing a computer program, comprising:
   determining whether a page zero mode is effective;
   restricting computer program addresses to page zero when in the page zero mode; and
   performing reduced clock cycle instructions when in the page zero mode;
   wherein the reduced clock cycle instructions eliminate upper order address operations during microcode program execution of flow transfer instructions.

6. A microcontroller comprising:
   a memory having an address space;
   means for setting an access mode, said access mode being a page zero mode or a full mode;
   means for determining the access mode set;
   means for restricting access to the lower order address bits of the address words in the address space when in the page zero mode; and
   means for setting the upper order address bits of the address word to zero in a page zero mode; and
   means for allowing full access to all bits of the address words in the address space when in the full mode.

7. A processor comprising an execution unit, the execution unit comprising:
  means for specifying at least first and second memory access mode values;
  means for executing instructions using memory addresses having:
    a first length in response to the first memory access mode value, and
    a second length in response to the second memory access mode value, the first length being longer than the second length; and
  in response to the second memory access mode value and an interrupt or exception, the execution unit stores a program counter having the second length; and
  in response to the first memory access mode value and an interrupt or exception, the execution unit stores a program counter having the first length.

8. The processor of claim 7, wherein the means for specifying comprises a mode storage location.

9. The processor of claim 7 wherein
  a. the first and second memory access mode values indicate whether a single page memory access mode is off or on, respectively;
  b. the execution unit is arranged to be coupled to a memory organized into a plurality of pages, full addresses for the memory having the first length, addresses within a single page of the memory being specifiable with addresses of the second length.

10. The processor of claim 7 wherein selected types of the instructions specify addresses having
  the first length in response to the first memory access mode value; and
  the second length, in response to the second memory access mode value.

11. The processor of claim 10, wherein the selected types require at least one less clock cycle to execute in response to the second memory access mode value than in response to the first memory access mode value.

12. The processor of claim 7, wherein the execution unit, responsive to an interrupt or exception,
  forces a program counter to a predetermined value in response to the first memory access mode value; and
  skips such forcing in response to the second memory access mode value.

* * * * *